F. WEBB.
TRAMMEL WHEEL.
APPLICATION FILED MAY 8, 1913.
1,133,517. Patented Mar. 30, 1915.
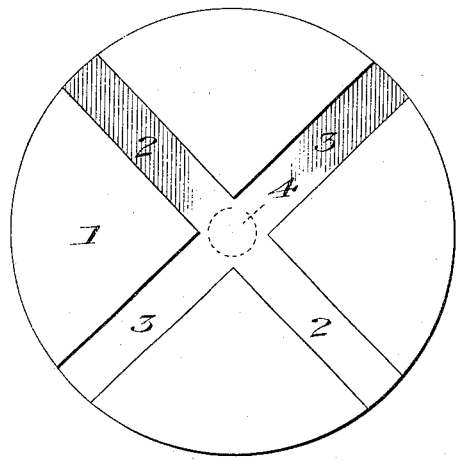
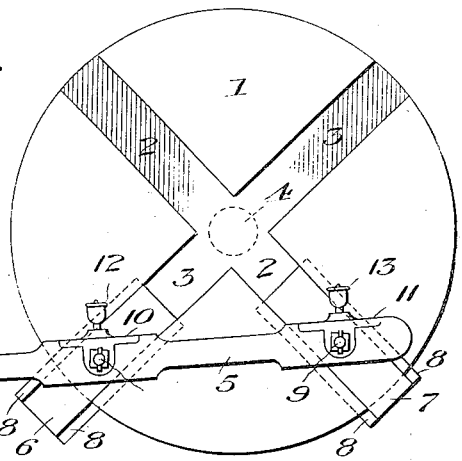
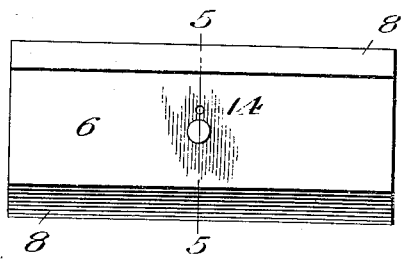
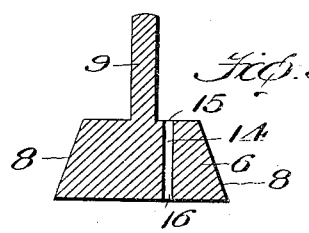
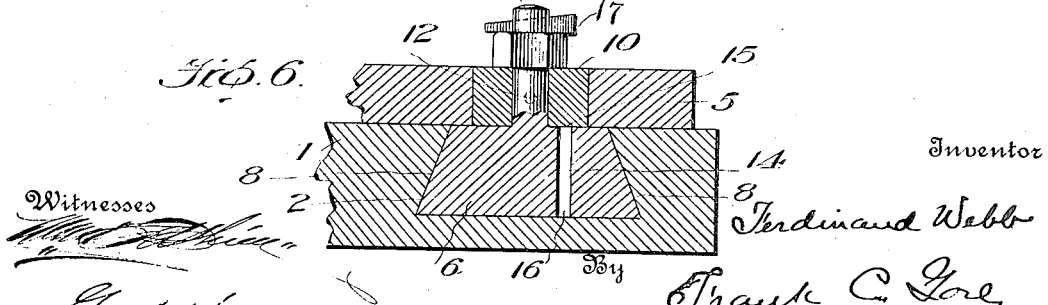
Inventor
Ferdinand Webb
By Frank C. Gore
His Attorney
Witnesses

UNITED STATES PATENT OFFICE.

FERDINAND WEBB, OF STEWARTSVILLE, INDIANA, ASSIGNOR OF ONE-THIRD TO GEORGE W. NORTON AND ONE-THIRD TO MAGNUS F. BOYLE, BOTH OF POSEY COUNTY, INDIANA.

TRAMMEL-WHEEL.

1,133,517.   Specification of Letters Patent.   Patented Mar. 30, 1915.

Application filed May 8, 1913. Serial No. 766,357.

*To all whom it may concern:*

Be it known that I, FERDINAND WEBB, a citizen of the United States, residing at Stewartsville, county of Posey, and State of Indiana, have invented certain new and useful Improvements in Trammel-Wheels, of which the following is a specification.

This invention relates to trammel wheels.

The object of the invention is the provision, first, of an improved trammel wheel; second, of improved lubricating means for trammel wheels; third, the provision of a trammel wheel having improved lubricating means for the wrist pins and slides.

The invention consists of certain improved features and combinations of parts set forth fully hereinafter.

In the accompanying drawings:—Figure 1 is a face view of the trammel wheel with the slides and connecting rod removed; Fig. 2, an edge view thereof; Fig. 3, a face view of the complete trammel wheel, slides, and connecting rod; Fig. 4, a detail plan view of one of the slides; Fig. 5, a section on line 5—5, Fig. 4; and Fig. 6, a detail view showing the means for lubricating the wrist pin and the slide.

My invention relates to those devices known as trammels which are adapted for converting reciprocating into rotary motion with a large increase of power and speed.

The trammel wheel 1 is provided with dove-tailed channels or seats 2 and 3 which are arranged at right angles to each other and intersect at the center of the wheel, the latter being carried by a shaft 4 through which any mechanism may be driven, or, the shaft 4 may be the driver for converting its rotary motion into a reciprocating motion of the connecting rod 5.

The slides 6 and 7 are provided with beveled edges 8 and fit and slide in the dove-tailed seats 2 and 3, respectively.

Referring to Figs. 4 and 5, each slide has a rigid or integral wrist pin 9 projecting from its outer face, said wrist pins being received in bearings 10 and 11 on the connecting rod 5. The bearings may be lined and of any preferred construction. The connecting rod is provided with oil cups or lubricators 12 and 13 which communicate with ports leading to the bearings aforesaid, whereby lubricant is supplied in proper or suitable quantities to the bearings and the wrist pins.

The slides 6 and 7 are provided with lubricating ducts 14 running from their outer to their inner faces, said ducts being arranged with their receiving mouths 15 along side the wrist pins and under the connecting rod 5 in line with the bearings 10 and 11, respectively, so that the lubricant after passing to the bearings from the cups 12 and 13, works down through the ducts 14 and out at 16 into the channels 2 and 3, causing lubrication of the slides as they play in the aforesaid channels.

The outer ends of the channels 2 and 3, being open, and the slides being adapted to project beyond the periphery of the trammel wheel 1, as shown in Fig. 3, the lubricant drains by centrifugal action out through the ends of said channels, thereby preventing gumming and tending to keep the channels relatively clean.

Any suitable means such as the nuts and gibs 17 may be employed on the wrist pins 9 to hold the connecting rod 5 thereon.

The present invention is adapted for use in any connection where it is desired to convert a reciprocating motion into a rotary motion with an increase in power and a very great increase in speed, and it is adapted for use on direct connected electric generator sets as the connecting rod 5 will be driven by the piston of the engine and the shaft 4 will be directly coupled to the electric generator which may then be driven at high speed with the same fuel consumption as if driven at the same speed as that of the engine.

Having no face plate or parts other than the trammel wheel, the slides and the connecting rod 5, friction is minimized and the construction made more durable and less expensive than other trammels while, at the same time, the system of automatic lubrication insures the greatest ease of operation, resulting in very small wear.

Having thus described my invention, what I claim as new and desire to secure by Letters Patent, is:—

In a trammel, the combination with a trammel wheel having intersecting channels, of slides movable in said channels and having wrist pins, a connecting rod journaled to the wrist pins, said slides being provided with lubricating ducts or ports extending therethrough from their outer faces, the mouths of said ports opening out through the outer faces of the slides adjacent the wrist pins and under the inner face of the connecting rod, and lubricators carried by the connecting rod which are arranged to feed the lubricant to the wrist pins, whence it passes into the ducts aforesaid.

In testimony whereof, I hereunto affix my signature in presence of two witnesses.

FERDINAND WEBB.

Witnesses:
 GEO. W. NORTON,
 FRED M. FAUL.